United States Patent
Eisen et al.

(10) Patent No.: US 6,653,413 B1
(45) Date of Patent: Nov. 25, 2003

(54) PROCESS FOR THE PRODUCTION OF STEREOREGULAR POLYMERS AND ELASTOMERS OF ALPHA-OLEFINS AND CERTAIN NOVEL CATALYSTS THEREFOR

(75) Inventors: Moris Eisen, Tyvon (IL); Victoria Volkis, Haifa (IL); Michal Shmulinson, Ramat Almogi Haifa (IL); Claudia Averbuj, San Diego, CA (US); Edith Tish, Ashkelon (IL)

(73) Assignee: Technion Research and Development Foundation Ltd., Haifa (IL)

( * ) Notice: Subject to any disclaimer, the term of this patent is extended or adjusted under 35 U.S.C. 154(b) by 0 days.

(21) Appl. No.: 09/492,033

(22) Filed: Jan. 27, 2000

Related U.S. Application Data

(63) Continuation-in-part of application No. PCT/IL98/00344, filed on Jul. 24, 1998.

(30) Foreign Application Priority Data

Jul. 27, 1997 (IL) .................................................. 121402
Nov. 5, 1997 (IL) .................................................. 122115

(51) Int. Cl.$^7$ .............................. C08F 4/00; C08F 4/44; B01J 31/38
(52) U.S. Cl. ........................ 526/73; 526/161; 526/172; 526/351; 502/117; 502/155
(58) Field of Search ................................. 526/161, 172, 526/346, 347, 351, 73; 502/104, 117, 152, 155

(56) References Cited

U.S. PATENT DOCUMENTS

| | | | |
|---|---|---|---|
| 5,318,935 A | 6/1994 | Canich et al. | 502/117 |
| 5,996,157 A | 12/1999 | Smith et al. | 15/28 |
| 6,255,414 B1 * | 7/2001 | Ittel et al. | 526/115 |

FOREIGN PATENT DOCUMENTS

| | | |
|---|---|---|
| EP | 675138 | 12/1993 |
| EP | 687 693 | 6/1995 |

OTHER PUBLICATIONS

Eisen et al., Organometallics, 1998, 17, 3155–3157.*
Eisen et al., J. Am. Chem. Soc. 1998, 120 8640–8646.*
Schweder et al., JOMC 508 (1996) 13–22.*
Rausch et al., Organometallics, 1995 14, 1827–1833.*
Volkis et al, "Pressure Modulates Stereoregularities in the Polymerization of Propylene Promoted by rac–Octahedral Heteroallyic Complexes", *Organometallics*, 17(15):3155–3157, 1998.
Flores et al, "[N,N'—Bis(trimethylsily) benzamidinato]titanium and –zirconium compounds. Synthesis and Application as Precursors for the Syndiospecific Polymerization of Styrene", *Organometallics*, 14(4):1827–1833, 1995.
Herskovics–Korine et al, "Bis(trimethylsily) Benzamidinate Zirconium Dichlorides. Active Catalysts for Ethylene Polymerization", *J. Organometallic Chem*, 503:307–314, 1995.
Mack et al, "Synthesis, characterization and reactivity of amido titanium and zirconium complexes", *J. Organometallic Chem*, 525:81–87, 1996.

(List continued on next page.)

Primary Examiner—David W. Wu
Assistant Examiner—R. Harlan
(74) Attorney, Agent, or Firm—G. E. Ehrlich Ltd.

(57) ABSTRACT

A process for the polymerization of one or more alpha-olefins having at least 3 carbon atoms, which comprises contacting the monomer or monomers in a polar or non-polar solvent under polymerization conditions with a homogeneous catalyst system including (a) a cationic form of a racemic mixture of a chiral octahedral transition metal complex or of a non chiral octahedral transition metal complex, comprising 1, 2 or 3 bidentate chelating ligands and no cyclopentadienyl ligands and having $C_1$, $C_2$, or $C_3$ symmetry; and (b) an anion of a Lewis acid or a Brönsted acid; and adjusting the pressure so as to obtain either a highly stereoregular polymer or copolymer or an elastomer.

27 Claims, 3 Drawing Sheets

OTHER PUBLICATIONS

Walther et al, "Zirkoniumorganische Chemie mit anorganischen Donorliganden N,N'—Bis(trimethylsily) benzamidinat (Siam) in Verbindungen des Typs (Siam)$_2$ ZrX$_2$ (X=Methyl, Benzyl, Allyl, Chlorid oder Iodid) und (Siam)$_3$ ZrX (X=Chlorid)", *J. Organometallic Chem*, 508:123–22, 1996.

Averbuj et al, "Stereoregular Polymerization of α–Olefins Catalyzed by Chiral Group 4 Benzamidinate Complexes of C$_1$ and C$_3$ Symmetry", J. American Chem Soc, 120(34):8640–8646, 1998.

\* cited by examiner

PROCESS FOR THE PRODUCTION OF STEREOREGULAR POLYMERS AND ELASTOMERS OF ALPHA-OLEFINS AND CERTAIN NOVEL CATALYSTS THEREFOR

This is a continuation-in-part of PCT application Ser. No. IL98/00344, filed Jul. 24, 1998, which claims priority from Israel Patent application Ser. No. 121402, filed Jul. 27, 1997, and Israel Patent application Ser. No. 122105, filed Nov. 5, 1997.

FIELD AND BACKGROUND OF THE INVENTION

The present invention relates to (i) the use of octahedral transition metal complexes as precatalysts for the polymerization of alpha-olefins; (ii) the use of homogeneous catalyst systems comprising these complexes and (iii) a novel class of such complexes. More particularly, the invention relates to the use of cationic chiral, racemic or non-chiral catalysts of the above-mentioned type for the polymerization of alpha-olefins to produce highly stereoregular polymers or poly alpha-olefin elastomers.

The polymerization of alpha-olefins with Ziegler-Natta catalysts is well-known in the chemical industry and it is used to a large extent. The various polymers that are derived from the polymerization of such olefins show differences in their chemical and physical properties, as a result of differences in molecular structure and molecular weights. Polymers of alpha-olefins having three or more carbon atoms as the monomeric unit will have pendant hydrocarbyl groups attached to the polymer backbone chain. The arrangement of these hydrocarbyl groups along the polymer backbone will determine, to a large extent, the physical properties of a particular polymer. For example, strong polymers tend to be stereochemically regular meaning that the adjacent pendant hydrocarbyl groups reside on the same side of the polymer backbone.

Three major types of stereoregularity, or tacticity have been characterized: atactic, isotactic and syndiotactic configurations. Atactic polyolefins are those wherein the pendant hydrocarbyl groups have no regular order in space with reference to the backbone and to other pendant groups. These are amorphous materials and are generally unsuitable for applications where high strength is required. Isotactic polyolefins are those wherein the pendant hydrocarbyl groups are ordered in space on the same side or plane of the polymer backbone chain. Polyolefins that are highly isotactic exhibit a high degree of crystallinity and high melting points, and accordingly are particularly suited to high strength applications.

The degree of stereoregularity may be determined from the pentad analysis using carbon-NMR techniques. A purely isotactic polyolefin will have a degree of crystallinity (mmmm) value of close to 100, whereas atactic poly alpha-olefins will have a theoretical statistical value of 6.5.

Syndiotactic polyolefins are those wherein the pendant hydrocarbyl groups of the polymer backbone alternate sequentially from one side or plane to the opposite side or plane relative to the polymer backbone. Although syndiotactic polymers, as compared with the corresponding isotactic polymers, are characterized by lower melting points, they are generally suitable for high strength applications, provided that their molecular weight exceeds 100,000 daltons.

Another category of high polymers with special stereo-sequencing is elastic polymers, or elastomers. As taught by *Textbook of Polymer Science* (edited by Fred W. Billmeyer, Jr., 3rd edition, Wiley Interscience: New York, 1984), page 507, the unique properties of elastomers include their ability to stretch and retract rapidly. Elastomers exhibit high strength and modulus while stretched, and recover fully on release of the stress. To obtain these properties, certain requirements are placed upon the molecular structure of the compounds: they must be high polymers, be above their glass transition temperatures, be amorphous in the unstretched state, but preferably develop crystallinity on stretching, and contain a network of crosslinks to restrain gross mobility of the chains.

In addition to the above-mentioned form of elastic polymers, polymers that contain crystalline areas (domains) and amorphous areas also exhibit elastomeric properties. This can be achieved in different ways, leading to (at least) two different microstructures, both of which are germane to the instant invention:

(a) a polymer containing domains of stereoregular and atactic sections, consecutively arranged in each polymer chain; and (b) a stereoregular polymer in which the inclusion of numerous stereoregular mistakes provides the material with atactic parts.

The polymer described in (b) has elastomeric properties because the crystalline, stereoregular parts of the chains form lamellae, and the mistakes, incorporated into the otherwise stereoregular sequences, and when present in sufficient quantity, form the amorphous domains that provide the material with elastomeric properties.

One of the most important parameters to measure the elasticity is the modulus (for elongation of 300–400%). For example, natural rubber and SBR polymers have a modulus of 2500 psi; neoprene, which is not very elastic, has a modulus of about 1000 psi; isotactic polypropylene has a modulus of 91 psi.

Conventional titanium and zirconium based Ziegler-Natta catalysts for the preparation of isotactic polymers are well known in the art. The systems are, however, limited in terms of molecular weight, molecular weight distribution and tacticity control. Additional methods of producing isotactic polymers from an alumoxane cocatalyzed metallocene were reported by Ewen, J. Am. Chem. Soc., 106, 6355 (1984) and Kaminsky et al., Angew. Chem. Int. Ed. Eng., 24, 507 (1985).

The use of cocatalyzed catalyst systems for the production of highly crystalline polyolefins is disclosed in U.S. Pat. No. 5,318,935. The catalyst systems described therein comprise a complex formed upon admixture of the amido group IVb transition metal component with an alumoxane component.

According to a recent review (M. S. Eisen et al., J. Organometallic Chem., 503, 307 (1995)), a series of bis(trimethylsilyl)benzamidinate zirconium dichlorides are described as active catalysts for ethylene polymerization. As taught therein, the polymerization activity increases drastically with increasing pressure. However, these catalyst systems are generally characterized by a pronounced moisture-sensitivity due to the inherent hydrolytic instability imposed by the presence of several Si—N bonds in the molecules.

Homogeneous catalysts for stereoregular olefin polymerization are further disclosed in U.S. Pat. No. 5,330,948. According to this patent, by using a metallocene catalyst having a chiral substituent selected from neomenthyl, menthyl and phenylmenthyl with a cocatalyst, better control over the desired properties of the resulting polymer is achieved.

U.S. Pat. No. 5,594,080 describes metallocene catalysts bearing cyclopentadienyl-type ligands, which are used in the production of elastomeric polyolefins. The structure and therefore the properties of the obtained products depend on several factors, inter alia the olefin monomer pressure during the polymerization and the nature of the cyclopentadienyl-based ligands.

The synthesis of stereoregular polymers has been reported (M. Bochmann, J. Chem. Soc., Dalton Trans. 225, (1996); H. H. Brintzinger, D. Fischer, R. Mülhaupt, B. Rieger and R. M. Waymouth, Angew. Chem., Int. Ed. Engl. 34, 1143 (1995)) by using chiral organo-group IV (Ti, Zr, Hf) catalysts having approximate $C_2$ symmetry. Most of the ligands for these "$C_2$" catalysts are based upon indenyl or related cyclopentadienyl components and are difficult and expensive to synthesize.

Octahedral transition-metal complexes for use in homogeneous catalyst systems for the polymerization of alpha-olefins are known. EP-A-0 675138 discloses the use of a catalyst comprising the cationic form of benzamidinato octahedral transition metal complexes and an anion of a Lewis acid or Brönsted acid for the polymerization of alpha-olefins including propylene. The polymerization reaction can be carried out at a pressure in the range from atmospheric pressure to 200 kg/cm$^2$G. Although the polymerization catalyst disclosed is a cationic form of an octahedral transition metal complex, and the homopolymerization of propylene is specifically disclosed, there is no mention of the tacticity of the polymer, and more specifically, there is no teaching of the tacticity characteristics of the polymer as a function of the olefin monomer or pressure.

EP-A-0 687693 describes the use of amidinato catalyst systems for the polymerization of alpha-olefins. Among possible cocatalysts, alumoxanes and boron compounds are mentioned. The alpha-olefins to be polymerized have at least 3 carbon atoms, and the polymerization can be carried out at a pressure of from 1 to 3000 bar. As with EP-A-0 675138, there is no indication of the tacticity characteristics of the polymer, nor is it suggested how the tacticity characteristics of the polymer may depend on the pressure or partial pressure of the olefin monomer. There is certainly no indication that the catalyst systems and operating conditions can be designed to produce polymers and copolymers having specific, desired tacticities. Furthermore, the formation of elastomers from homogeneous catalyst systems of this type is unknown.

There is thus a great need for, and it is highly desirous to have, inexpensive, moisture-insensitive catalyst systems that enable the production of stereoregular poly alpha-olefins in an efficient manner, with high conversions and yields, and a need for efficient methods of producing these stereoregular poly alpha-olefins. There is also a great need for catalyst systems and methods for the production of elastomeric poly alpha-olefins. Moreover, it would be highly advantageous to have catalyst systems and methods for the production of poly alpha-olefins in which the tacticity—qualitative and quantitative—of the polymers could be predicted and produced using rational design.

SUMMARY OF THE INVENTION

Accordingly, it is an object of the present invention to provide a method of polymerization of one or more alpha-olefins to form polymers having a preselected range of properties, ranging from isotactic to elastomeric properties.

It is another object of the invention to provide improved, low-cost homogeneous precatalysts for polymerization, which, when used with an appropriate cocatalyst, permit the efficient polymerization of alpha-olefins to produce highly stereoregular polymers.

It is another object of the invention to provide improved, low-cost homogeneous precatalysts for polymerization, which, when used with an appropriate cocatalyst, permit the efficient polymerization of alpha-olefins to produce elastomeric polymers.

It is another object of the invention to provide a new class of catalysts, which, as contrasted to the known catalysts that contain cyclopentadienyl ligands, are not decomposed when exposed to air or humidity.

Thus, according to the teachings of the present invention there is provided a process for the polymerization of one or more alpha-olefins having at least 3 carbon atoms, the process comprising the steps of (a) contacting the monomer or monomers in a solvent selected from the group consisting of polar and non-polar solvents under polymerization conditions with a homogeneous catalyst system including (i) a cationic form of a chiral or a non chiral octahedral transition metal complex, comprising 1, 2 or 3 bidentate chelating ligands and no cyclopentadienyl ligands and having symmetry selected from the group consisting of $C_1$, $C_2$, and $C_3$ symmetries; and (ii) an anion of an acid selected from the group consisting of a Lewis acid and a Brönsted acid; and (b) adjusting the pressure to obtain either a highly stereoregular polymer, a copolymer or an elastomer.

The homogeneous catalyst system can include a racemic or non-racemic mixture of said chiral octahedral transition metal complex.

According to the teachings of the present invention there is further provided a homogeneous catalyst system comprising (a) a cationic form of a chiral octahedral transition metal complex comprising 1, 2 or 3 bidentate chelating ligands and no cyclopentadienyl ligands and having symmetry selected from the group consisting of $C_1$, $C_2$, and $C_3$ symmetries; and (b) an anion of an acid selected from the group consisting of a Lewis acid and a Brönsted acid.

In a preferred embodiment, the symmetry of the homogeneous catalyst system is $C_1$ symmetry. In another preferred embodiment, the symmetry of the homogeneous catalyst system is $C_2$ symmetry. In yet another preferred embodiment, the symmetry of the homogeneous catalyst system is $C_3$ symmetry.

In a preferred embodiment, the cationic form of the transition metal component of the catalyst system utilized in the above-mentioned process can be represented by formula A or formula B:

Formula A:

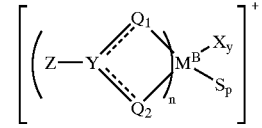

Formula B:

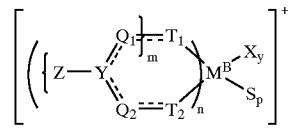

wherein X is an anionic ligand; M is a transition metal atom selected from groups III, IV, and V of the periodic table of elements; B, the valency of M, equals 3, 4 or 5; Y is C, N, S, P, B or Si; $Q_1$, $Q_2$, $T_1$ and $T_2$ are each independently selected from the group consisting of O, OR, N, NR, NR$_2$, CR, CR$_2$, S, SR, SiR$_2$, B, BR, BR$_2$, P, PR and PR$_2$, where each R is independently H or a group containing C, Si, N, O, B and/or P, whereas one or more R groups may be attached to M, each replacing the anionic ligand identified herein by X; Z is selected from H, OR, $NR_2$, CR, $CR_2$, $CR_3$, SR, $SiR_3$, $PR_2$ or $BR_2$; S is a solvent molecule; m is an integer selected from the group consisting of 1, 2, 3 or 4; n is an integer selected from the group consisting of 1, 2 or 3; y equals (B−n−1); and p is 0 or an integer to satisfy octahedral coordination requirements of the transition metal atom M.

In a preferred embodiment, the octahedral transition metal complexes characterized by formula A and formula B are of $C_s$ symmetry, n equals one, and the transition metal is selected from the group consisting of zirconium and hafnium. The application of high pressure produces poly alpha-olefins that are substantially elastomeric.

In another preferred embodiment, the octahedral transition metal complex has $C_2$ or $C_3$ symmetry and the transition metal is selected from the group consisting of zirconium and hafnium. At high pressure, substantially pure isotactic poly alpha-olefins are obtained. At low pressure, non-stereoregular (atactic-type) poly alpha-olefins are obtained. When the pressure is alternated between high pressure and low pressure, an elastomer with atactic and isotactic segments is produced. The pressure alternation is preferably performed at a frequency lower than or about equal to the polymerization insertion rate. In a preferred embodiment, the alternation of pressure is carried out at a frequency of about $10^{-4}$ to 100 Hertz.

Homogeneous catalyst systems for the production of stereoregular poly alpha olefins that include a cationic form of a chiral octahedral transition metal complex or a racemic mixture of an octahedral transition metal complex were not known prior to their disclosure in Israel Patent Application Serial No. 121402 and Israel Patent Application Serial No. 122105, from which the instant application claims priority. Moreover, according to known theory, a homogeneous catalyst system including a cationic form of a racemic mixture of an octahedral transition metal complex having $C_1$ symmetry should produce isotactic (stereoregular) alpha-olefins; a non-chiral octahedral transition metal complex having $C_{2v}$ symmetry (or higher) should produce atactic alpha-olefins. By contrast, it has been discovered by the inventors of the instant invention that, at high pressures, homogeneous catalyst systems (of the present invention) which include a cationic form of octahedral zirconium or octahedral hafnium metal complexes having $C_1$ symmetry and one bidentate chelating ligand, produce elastomers.

In a preferred embodiment, the transition metal of the octahedral complex is selected from the group consisting of vanadium, niobium, tantalum, scandium, yttrium, lanthanum, lanthanides, and actinides.

In this respect, the behavior of titanium would be expected to be qualitatively similar to that of zirconium and hafnium, because titanium, zirconium and hafnium belong to the same transition metal family and because they have been used in a substantially identical fashion in the polymerization of alpha-olefins with conventional Ziegler-Natta catalysts. It has been discovered, however, that at high pressure, homogeneous catalyst systems that include a cationic form of (chiral and non-chiral) octahedral titanium metal complexes of the present invention produce elastomers. The formation of elastomers using said octahedral titanium metal complexes is substantially irrespective of symmetry ($C_1$, $C_2$, and $C_3$) and solvent. Alternation of pressure is unnecessary, such that operation is greatly simplified.

Hence, further according to the teachings of the present invention there is provided a process for the polymerization of one or more alpha-olefins having at least 3 carbon atoms, comprising contacting alpha-olefin monomer or monomers in a solvent selected from the group consisting of polar solvents and non-polar solvents under polymerization conditions and above atmospheric pressure with a homogeneous catalyst system, said homogeneous catalyst system including: (i) a cationic form of a chiral or a non chiral octahedral titanium complex, comprising 1, 2 or 3 bidentate chelating ligands and no cyclopentadienyl ligands; and (ii) an anion of an acid selected from the group consisting of a Lewis acid and a Brönsted acid, to obtain an elastomer.

In a preferred embodiment, the homogeneous catalyst system includes a racemic or non-racemic mixture of said chiral octahedral titanium complex. Further provided is a homogeneous catalyst system including: (a) a cationic form of an octahedral titanium complex having $C_s$ symmetry, and (b) an anion of an acid selected from the group consisting of a Lewis acid and a Brönsted acid.

Further provided is a process for the polymerization of one or more alpha-olefins having at least 3 carbon atoms, comprising contacting alpha-olefin monomer or monomers in a solvent selected from the group consisting of a polar solvent and a non-polar solvent under polymerization conditions, at or above atmospheric pressure, with a homogeneous catalyst system, said homogeneous catalyst system including: (i) a cationic form of an octahedral titanium complex having CS symmetry; and (ii) an anion of an acid selected from the group consisting of a Lewis acid and a Brönsted acid, to obtain an elastomer.

It has been discovered by the inventors of the instant invention that a chiral, octahedral transition metal complex having $C_1$ or $C_2$ symmetry is used to obtain syndiotactic polystyrene of very high stereoregularity. The activity of such complexes is over an order of magnitude higher than the activities of non-chiral octahedral complexes of the prior art ($2.5 \times 10^6 - 1 \times 10^7$ in the instant invention vs. $1.2 \times 10^5 - 5.5 \times 10^5$). The stereoregularity of the polystyrene produced in processes of the instant invention is also superior to that of prior-art processes.

Hence, further provided is a polymerization process comprising the steps of contacting styrene monomer or monomers comprising styrene in a solvent selected from the group consisting of polar and non-polar solvents under polymerization conditions and at a pressure of about atmospheric or higher with a homogeneous catalyst system including: (i) a cationic form of a chiral octahedral transition metal complex comprising 1, 2 or 3 bidentate chelating ligands and no cyclopentadienyl ligands and having symmetry selected from the group consisting of $C_1$ and $C_2$ symmetries, and (ii) an anion of an acid selected from the group consisting of a Lewis acid and a Brönsted acid, to obtain syndiotactic polystyrene or a copolymer comprising syndiotactic polystyrene.

In a preferred embodiment of the invention, an octahedral complex having $C_1$ or $C_2$ symmetry is used at low pressure to obtain an elastomeric copolymer containing sequences of syndiotactic polystyrene and atactic poly-aliphatic alpha-olefins. Propylene is a preferred aliphatic alpha-olefin.

In another preferred embodiment, an octahedral complex having $C_1$ or $C_2$ symmetry is used at alternating pressure to obtain an elastomeric copolymer containing sequences of syndiotactic polystyrene and isotactic and atactic sequences of poly-aliphatic alpha-olefins. Propylene is a preferred aliphatic alpha-olefin for this embodiment.

It has been found that homogeneous catalyst systems having cationic octahedral transition metal complexes (of the present invention) and possessing $C_1$, $C_2$ or $C_3$ symmetry are suitable for hydrogenation reactions. Racemic mixtures of C$_2$-symmetry complexes and monoheteroallylic complexes have been found to be particularly suitable.

As described above, the present invention largely relates to homogeneous catalyst systems having cationic octahedral transition metal complexes and to processes utilizing such systems to produce materials of desired tacticity: stereoregular polymers or elastomeric polymers. By sharp contrast, according to known theory and experimentation, tetrahedral transition metal complexes produce atactic polymers.

Surprisingly, it has been discovered that tetrahedral transition metal complexes of a particular structure can produce elastomeric polymers. Moreover, the elastomeric polymers are of a novel and significant variety.

Hence, a process is provided for the polymerization of alpha-olefins having at least 3 carbon atoms is herein provided, comprising contacting the alpha-olefin monomer in a solvent selected from the group consisting of polar solvents and non-polar solvents under polymerization conditions, at or above atmospheric pressure, with a homogeneous catalyst system comprising (a) a cationic form of a tetrahedral complex having (i) a transition metal center, and (ii) one or more Lewis basic pendant groups capable of donating one or more pairs of free electrons to the transition metal center; and (b) an anion of an acid selected from the group consisting of a Lewis acid and a Brönsted acid, to obtain an elastomer.

In a preferred embodiment, the cationic form of the tetrahedral complex is of the form:

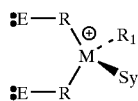

wherein:
E is a donating group with a free pair of electrons; R$_1$ is selected from the group consisting of H, alkyl, aryl and silyl; S is a solvent molecule; y is 0 or 1;
and R is C, B, N, P, O, S or any other anionic bridging group.

Preferably, the tetrahedral complex is of the form:

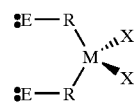

wherein: X is a halide; E is a donating group with a free pair of electrons; and R is C, B, N, P, O, S or any other anionic bridging group.

The process and mechanism thereof are developed further in the detailed description of the invention provided below. From the detailed description taken in conjunction with the figures and the appended claims, additional objects and advantages of the invention will be apparent to those skilled in the art.

As used herein in the specification and claims section below, the phrase "stereoregular" refers to a regular spatial ordering of pendant groups from the main backbone of the polymer; "isotactic" ordering is a stereoregular arrangement in which the pendant groups are arranged in space toward the same side of the backbone; "syndiotactic" ordering is a stereoregular arrangement in which the pendant groups are arranged around the backbone in an alternating form.

As used herein in the specification and claims section below, the phrases "elastomer", "elastomeric polymer" and the like refer to poly alpha-olefins having elastomeric properties, including the tendency to revert to the original shape after extension. Such elastomers are obtained in various ways, including the production of polymer chains having stereosequences alternating between crystalline stereoregular (e.g., isotactic or syndiotactic) and amorphous atactic. Elastomers can also be obtained by stereoregular "mistakes" that are incorporated into sequences that are otherwise stereoregular. Such mistakes are often produced by complexes that exhibit high kinetic activities.

As used herein in the specification and claims section below, the term "symmetry" is used in accordance with the standard definition and usage: the symmetry $C_n$ of a given molecule defines the number of times the original figure is reproduced during a complete rotation. The symmetry angle is $2\pi/n$ such that for $C_1$, the symmetry is $2\pi$ or 360°; for $C_2$, the symmetry is 180°; for $C_3$, the symmetry is 120°. Other, more specialized symmetries include $C_{2v}$, which has $C_2$ symmetry combined with vertical symmetry, and $C_s$ which has mirror-image symmetry.

As used herein in the specification and claims section below, the phrase "natural chiral center" refers to a carbon or to a metal in which the mirror image with all the substituents is not superimposable. A carbon center is not superimposable when surrounded by four different substituents. For metal centers, however, superimposability depends on the particular symmetry of the complex. Chiral complexes, by definition, are not superimposable.

As used herein in the specification and claims section below, the phrase "low pressure" refers to pressures below about 1 atmosphere; the phrase "high pressure" refers to pressures above about 1 atmosphere and preferably, to pressures above about 2 atmospheres. "Pressure" typically refers to the partial pressure of the monomer species, which affects the concentration of monomer in solution. However, the total absolute pressure also influences the equilibrium between the monomer concentration in solution to the monomer concentration gas-phase.

The phrase "alternating pressure" as used herein in the specification and claims section below, refers to a repetitive change of pressure from low to high and/or vice versa.

The phrase "bidentate chelating ligands", as used herein in the specification and claims section below, and as demonstrated in the plurality of examples provided herein, refers solely to monoanionic ligands.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the various forms of the invention may be embodied in practice.

In the drawings:

FIG. 1b provides a complex with two bidentate chelating ligands; and FIG. 1c provides a complex with three bidentate chelating ligands;

DESCRIPTION OF THE PREFERRED EMBODIMENTS

The present invention teaches (i) the use of certain octahedral transition metal complexes as precatalysts for the stereoregular and/or elastomeric polymerization of alpha-olefins; (ii) the use of homogeneous catalyst systems comprising these complexes; (iii) novel classes of such complexes; and (iv) the use of a specific class of tetrahedral transition metal complexes as precatalysts for the production of elastomeric poly alpha-olefins.

The principles of producing stereoregular and elastomeric polymers and copolymers according to the present invention may be better understood with reference to the drawings and the accompanying description.

A. The Cationic Form of the Transition Metal Component

Preferred embodiments of the cationic form of the transition metal component of the homogeneous catalyst system of the present invention can be represented by formula A or formula B:

Formula A:

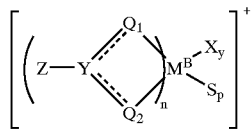

Formula B:

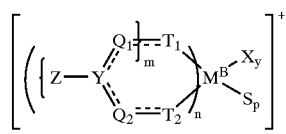

wherein X is an anionic ligand; M is a transition metal atom selected from groups III, IV, and V of the periodic table of elements; B, the valency of M, equals 3, 4 or 5; Y is C, N, S, P, B or Si; $Q_1$, $Q_2$, $T_1$ and $T_2$ are each independently selected from the group consisting of O, OR, N, NR, $NR_2$, CR, $CR_2$, S, SR, $SiR_2$, B, BR, $BR_2$, P, PR and $PR_2$, where each R is independently H or a group containing C, Si, N, O, B and/or P, whereas one or more R groups may be attached to M, each replacing the anionic ligand identified herein by X; Z is selected from H, OR, $NR_2$, CR, $CR_2$, $CR_3$, SR, $SiR_3$, $PR_2$ or $BR_2$; S is a solvent molecule; m is an integer selected from the group consisting of 1, 2, 3 or 4; n is an integer selected from the group consisting of 1, 2 or 3; y equals (B−n−1); and p is 0 or an integer to satisfy octahedral coordination requirements of the transition metal atom M.

A particularly interesting class of complexes are those wherein Z and/or Q have natural chirality center(s), for example, menthyl, neomenthyl, myrtanyl and/or alpha-phenethyl groups. These chiral substances are found in nature, they are inexpensive, yet more importantly they were both unexpectedly found to be highly effective while implementing the process of the present invention.

Figure 1A:
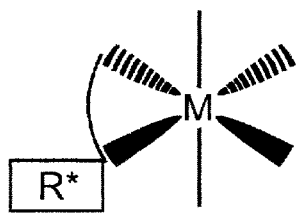
FIGS. 1a–c are schematic illustrations of octahedral transition metal complexes comprising bidentate chelating ligands arranged around the coordination sphere of the metal (M), wherein FIG. 1a provides a complex with one bidentate chelating ligand.
Figure 1B:
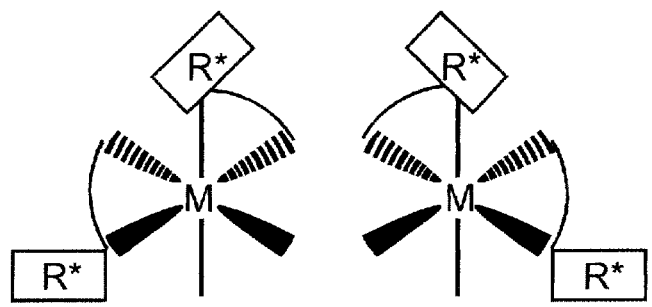
Figure 1C:
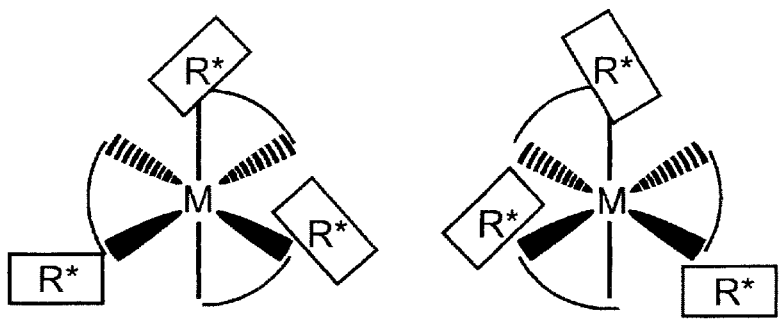
Figure 2:
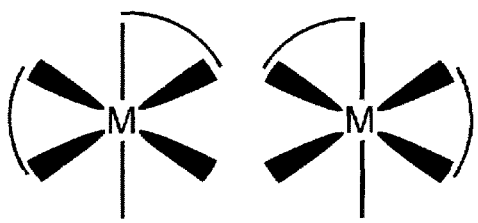
FIG. 2 is a schematic illustration of racemic octahedral complexes.

As can be seen in FIG. 1a, for n=1, when R* is a chiral group, the octahedral complexes that are obtained are chiral with a $C_1$ symmetry in all cases. When R* is non chiral, the complex provided in FIG. 1(a) has a symmetry of $C_s$ or higher (depending on the rest of the ligands). As can be seen in FIGS. 1b and 1c, for n=2 and n=3, respectively, when R* is a chiral group, a mixture of diastereomeric complexes having $C_2$ and $C_3$ symmetries, respectively, can be expected. When R* is a non-chiral group, the complexes are racemic mixtures of complexes with $C_2$ and $C_3$ symmetry, respectively, as illustrated in FIGS. 1b and 1c. As an additional example, a racemic mixture of octahedral complexes having $C_2$ symmetry is provided in FIG. 2.

B. Preparation of the Complex

The complexes according to the present invention can be prepared by known methods, e.g., those described in J. Organometallic Chem. 503, 307 (1995) and in the references mentioned therein, all of which are incorporated by reference as if fully set forth herein.

By way of example, the complex wherein the ligand comprises a chiral substituent R* such as menthyl, myrtanyl or phenethyl, is obtained by reacting a chiral amine with a compound containing a group such as alkyl, aryl or trimethylsilyl halide, in a high-boiling polar solvent such as tetrahydrofuran (THF). The resulting chiral amine compound, combined with an alkyl lithium complex and further with a nitrile group in a polar solvent such as dimethoxyethane (DME), dimethyl ether, or tetrahydofuran, will produce a lithium salt. This salt may be either reacted with an equimolar amount of water to obtain the free ligand or with a compound of the general formula $MX'_4$, wherein M is a cation derived from a transition metal, for example Ti, Zr or Hf, and X' is a halogen, e.g., Cl, Br or I (MX'4 preferably being $ZrCl_4$) in a polar or non polar solvent. Examples of such solvents are diethyl ether, pentane, toluene, THF, DME, etc. The free ligand may be reacted with a compound of the general formula $MX''_4$, wherein M is a cation derived from a transition metal, for example Ti, Zr or Hf, and X'' is an amido, phosphido, alkyl or aryl group ($MX''_4$ preferably being $Zr(N(CH_3)_2)_4$) in a polar or non-polar solvent. Examples of such solvents include diethyl ether, pentane, toluene, THF and DME.

According to one embodiment of the present invention, the halogen may be replaced by various alkyl, aryl, amine or phosphine groups.

Figure 3:
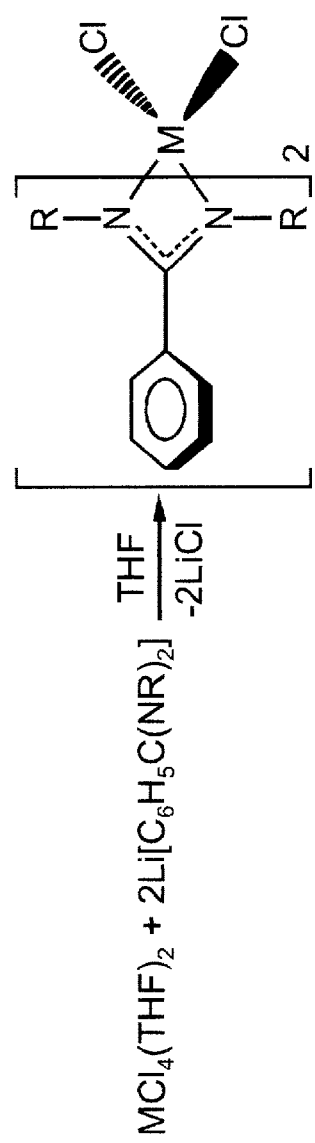
FIG. 3 provides a schematic representation of Ti and Zr complexes containing bulky benzamidinate ligands, according to the present invention.

A series of Ti and Zr complexes containing bulky benzamidinate ligands has been prepared while reducing the present invention to practiceTo this end, $TiCl_4(THF)_2$ or $ZrCl_4(THF)_2$ were reacted with two equivalents of $Li[C_6H_5C(NC_3H_7)_2]$ or $Li[C_6H_5C(NC_6H_{11})_2]$, producing in crystalline form the four bis-ligand complexes provided in FIG. 3.

By analogy, the reaction of $ZrCi_4$ with two equivalents of the substituted bis(trimethylsilyl)benzamidinate lithium-TMEDA complex (TMEDA-N,N,N',N'-tetramethylethylenediamine) yielded zirconium dichloride complexes in a crystalline form.

The cationic forms of the catalysts were generated by the reaction of the corresponding complexes with the cocatalyst.

C. The Cocatalyst

The catalyst system employed in the present invention comprises a complex of the transition metal component and a cocatalyst in an excess ratio for alumoxane cocatalysts and equimolar ratios for other Lewis acids or Brönsted acids cocatalysts. In a preferred embodiment, the co-catalyst includes oligomeric alumoxanes and alkylalumoxanes such as methyl alumoxane (MAO), or perfluoroaromatic boron compounds such as $B(C_6F_5)_3$, tris(perfluoro)naphtylborane, and tris(perfluoro)dibenzylborane. The methyl alumoxane should preferably have an average degree of oligomerization of from about 13 to about 25.

Brönsted acids that are particularly suitable as cocatalysts include those elonging to the families of trialkylammonium tetra(perfluoro)naphtylborates and trialkylammonium tetra (perfluoro)dibenzylborates, $(Et_3N)HB(C_6F_5)_4$, as well as, for example, $HN(CH_3)_3{}^+B(C_6F_5)_4{}^-$, $HN(CH_3)_3{}^+Al(C_6F_5)_4{}^-$, and $HP(CH_3)_3{}^+Al(C_6F_5)_4{}^-$.

D. The Polymerization Process

The polymerization process of the present invention is effected by contacting an olefin monomer or mixture of monomers with the catalyst system in a suitable organic solvent; and thereafter reacting the monomer(s) in the presence of the catalyst system under atmospheric pressure and/or elevated pressures, for a period and at a temperature sufficient to produce a polymer.

While reducing the present invention to practice, polymerizations were carried out under rigorously anaerobic/anhydrous vacuum line conditions, and reactions were quenched after appropriate times with methanol-HCl solutions prior to collection of the polymer, followed by washing with pentane and acetone and drying.

The monomer for the polymerization process is an alpha-olefin having at least three carbon atoms, such as propylene, 1-butene, 1-isobutylene, 1-pentene, 4-methyl-1-pentene, 1-hexene, 1,5-hexadiene, styrene or mixtures thereof.

Figure 4:
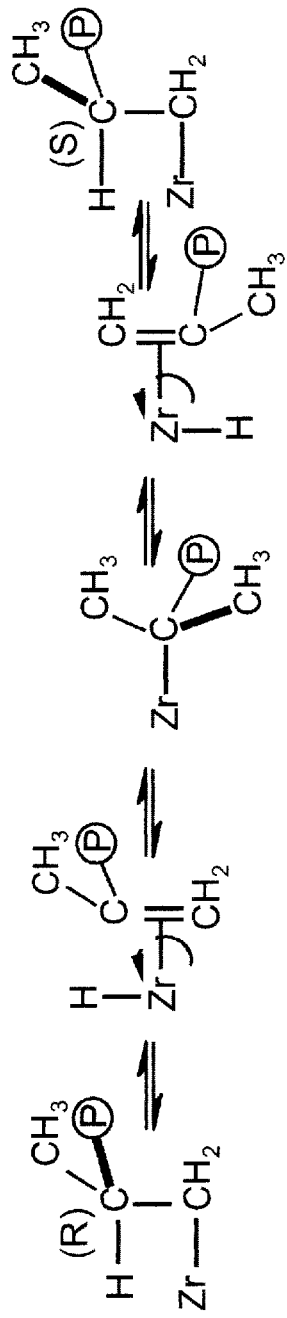
FIG. 4 illustrates the competing reactions of intramolecular epimerization reaction of the growing polypropylene chain at the last-inserted monomer unit, vs. the stereoregular insertion of propylene.

In metallocene catalysts of the prior art, polymer tacticity has been found to vary predictably with the structure of the metallocene catalysts. Complexes with $C_2$ or $C_1$ symmetry are expected to produce isotactic polyolefins, complexes with $C_s$ symmetry are expected to produce syndiotactic polyolefins, whereas those with $C_{2v}$ symmetry and higher generate atactic polymers (M. Bochmann, J. Chem. Soc., Dalton Trans. 225, (1996); H. H. Brintzinger, D. Fischer, R. M?llhaupt, B. Rieger and R. M. Waymouth, Angew. Chem., Int. Ed. Engl. 34, 1143 (1995)); M?hring, P. C.; Coville, N. J., J. Organomet. Chem. (1994), 479, 1). Surprisingly, however, when the polymerization of propylene is carried out at atmospheric pressure with an octahedral complex having $C_2$ symmetry, atactic polypropylene is formed as an oil, instead of the expected isotactic polymer. Without wishing to be limited by the theoretical explanation, it is believed that the formation of atactic polypropylene results from an intramolecular epimerization reaction of the growing polypropylene chain at the last-inserted monomer unit, the epimerization reaction being faster than the stereoregular insertion of propylene (FIG. 4).

While reducing the present invention to practice, it was discovered that with an octahedral complex having $C_2$ or $C_3$ symmetry, (the expected) isotactic polypropylene is formed (degree of crystallinity (mmmm)>99.5%; mp=161–164° C.) only when the polymerization is carried out at high concentrations of monomer (e.g., in liquid propylene). Again, without wishing to be limited by the theoretical explanation, it is believed that a high propylene concentration allows faster insertion of the monomer unit, substantially suppressing the epimerization reaction.

According to the present invention, by adjusting the pressure (i.e., the partial pressure of the monomer, which effects the monomer concentration in solution) of the polymerization reaction, the stereoregularity of the products may be controlled. Thus, in the polymerization of propylene and higher aliphatic olefins in the presence of a zirconium-based or hafnium-based catalyst of the present invention having $C_2$ or $C_3$ symmetry, an atactic product with an oily or amorphous appearance is produced at atmospheric pressure. On the other hand, under a higher pressure of above about two atmospheres or preferably more, a highly stereoregular thermoplastic product is obtained.

When the polymerization of aliphatic olefins is carried out under a pressure alternating between low pressure and high pressure, e.g., between a pressure below 1 atmosphere and above 2 atmospheres, an elastomeric product is obtained using zirconium-based or hafnium-based catalysts of $C_2$ or $C_3$ symmetry. Preferably, said pressure is alternated at a frequency about equal to or lower than the polymerization insertion rate, e.g., between $1 \times 10^{-4}$ and 100 Hertz.

Some of the examples of the production of elastomers by adjusting pressure in the presence of octahedral transition metal complexes of $C_2$ symmetry according to the present invention pertain to the block polymerization of aliphatic alpha-olefins, wherein one or more monomers is polymerized at high pressure to produce stereoregular (isotactic) poly alpha-olefins, and the resultant product material is subjected to low-pressure polymerization conditions in the presence of one or more monomers, to produce atactic poly alpha-olefins. The atactic poly alpha-olefins are incorporated in the isotactic material formed at high pressure, thereby producing an elastomeric polymer or copolymer.

According to known theory, a homogeneous catalyst system including a cationic form of a chiral octahedral transition metal complex (e.g., having $C_1$ or $C_2$ symmetry) should produce stereoregular (isotactic) alpha-olefins; whereas an octahedral transition metal complex of $C_{2v}$ symmetry and higher should produce atactic alpha-olefins. By contrast, it has been discovered while reducing the present invention to practice that homogeneous catalyst systems which include a cationic form of chiral octahedral zirconium metal complexes of the present invention having one bidentate chelating ligand (or racemic or non-racemic mixtures thereof) and having $C_1$ symmetry produce elastomers. Similarly, hafnium-based complexes of the present invention having $C_1$ symmetry have also been found to produce elastomers.

It is anticipated that the behavior of titanium would be qualitatively similar, in this respect, to that of zirconium and hafnium, because titanium, zirconium and hafnium belong to the same transition metal family, and because they have been used in a substantially identical fashion in the polymerization of alpha-olefins with conventional Ziegler-Natta catalysts.

It has been discovered, however, that at high pressure, homogeneous catalyst systems that include a cationic form of (chiral and non-chiral) octahedral titanium metal complexes of the present invention produce elastomers. The formation of elastomers using said octahedral titanium metal complexes is substantially irrespective of symmetry ($C_1$, $C_2$, or $C_3$) and solvent. Alternation of pressure is unnecessary, such that operation is greatly simplified.

The production of elastomers with titanium-based complexes of the present invention is exemplified by the formation of elastomeric polypropylene using a titanium-based complex, $(4\text{-}CH_3\text{—}C_6H_4)C(N(Si(CH_3)_3)_2)_2)TiCl_3$—THF. Although alternating the pressure will result in the formation of an elastomer, it was demonstrated that an elastomer can be obtained without alternating pressure from high pressure to low pressure.

The above-mentioned complex has $C_s$ symmetry, according to known theory, should produce stereoregular (syndiotactic) poly alpha-olefins. Surprisingly, however, elastomeric polypropylene is produced. Other titanium-based complexes of different symmetries, e.g., octahedral titanium complexes having $C_1$ symmetry, also have been found to produce elastomeric poly alpha-olefins. This, however, is not at all surprising, and indeed, could have been anticipated, with the knowledge that Ti-based octahedral complexes having $C_s$ symmetry produce elastomers, because $C_1$ symmetry, like $C_s$ symmetry, is expected to produce stereoregular poly alpha-olefins.

As described above, all prior-art processes utilize octahedral transition metal complexes that are non-chiral, perhaps because chiral octahedral transition metal complexes are expected to produce isotactic polysterene. Surprisingly, therefore, chiral octahedral transition metal complexes utilized in processes according to the present invention have been found to produce highly stereoregular, syndiotactic polystyrene. Moreover, the activity of the instant catalyst systems is 1–2 orders of magnitude higher than the activity of non-chiral systems of the prior art (Flores et al., "[N,N'-Bis(trimethylsilyl)benzamidinato]titanium and -zirconium Compounds. Synthesis and Application as Precursors for the Syndiospecific Polymerization of Styrene", Organometallics, 14, pp.1827–1833, 1995).

It is shown above that the expected isotactic polypropylene (mmmm>99.5%; mp=161° C.) can be formed when the polymerization is carried out at high concentrations of monomer (e.g., in liquid propylene) using octahedral complexes based on zirconium or hafnium and having $C_2$ or $C_3$ symmetry. This process is attributed to the resulting high propylene concentration in solution, which speeds up the insertion of the monomeric unit, such that the competing epimerization mechanism (leading to atactic polymerization) is suppressed almost completely.

It is shown herein for the first time that simple octahedral or even tetrahedral complexes which have a Lewis basic pendant group which can donate an electron lone pair to the highly electrophilic metal center can be applied in the preparation of a unique type of elastomeric polymers.

Figure 5:
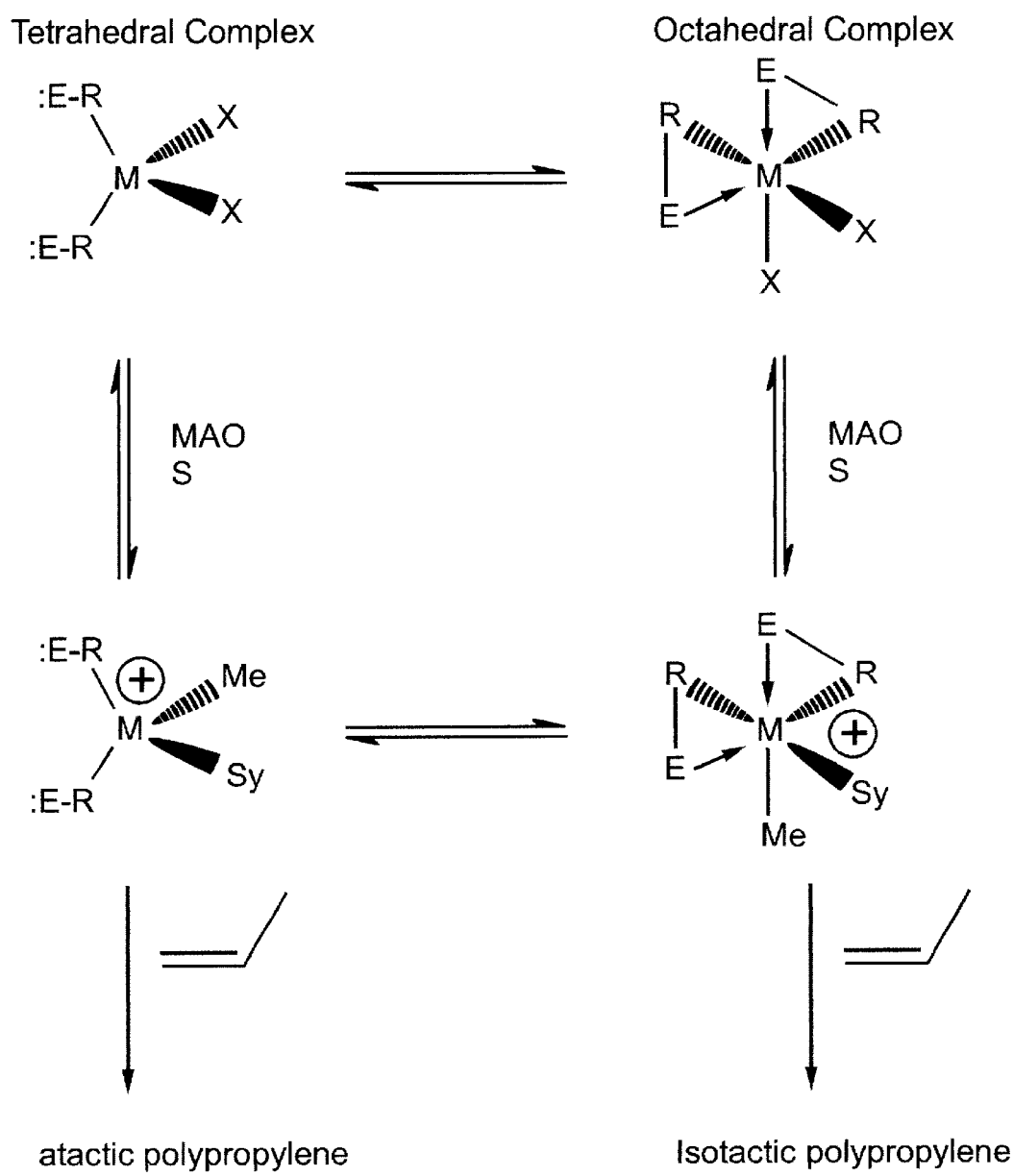
FIG. 5 illustrates, by way of example, the dynamic equilibrium between tetrahedral transition metal complexes having a particular structure (defined below) and octahedral transition metal complexes leading to competing mechanisms of isotactic and atactic insertions.

As shown in FIG. 5, this is attributed to the dynamic equilibrium between the tetrahedral and octahedral configuration: when the complex is in a tetrahedral form, an atactic polymer is obtained as anticipated by known theory; when the complex is in an octahedral form, after the donating groups attach to the metal center, an isotactic polymer is obtained. Without being limited by the postulated mechanism, it is believed that the dynamic equilibrium between the tetrahedral and octahedral forms induces the polymerization of an elastomeric α-olefin. This consecutive, dynamic process allows for the utilization of tetrahedral transition metal complexes for the production of a novel type of elastomeric polymer. Moreover, this consecutive, dynamic process allows for the rational design of this new type of elastomeric polymers in which the degree of stereoregularity—and hence, the elastomeric properties— can be predicted and tailored. For example, a tetrahedral complex can be designed such that the path via the octahedral complex is favored over the epimerization route (in terms of stability, kinetics, etc.), such that an elastomer of relatively high stereoregularity is obtained. It is also possible to design the polymerization conditions, choice of solvent (e.g., polarity) to this end. The choice of monomer or monomers should also affect the competition between the two routes and consequently, the elastomeric properties of the polymer product.

Thus, a process is provided herein for the polymerization of one or more alpha-olefins having at least 3 carbon atoms, comprising contacting alpha-olefin monomer or monomers in a solvent selected from the group consisting of polar solvents and non-polar solvents under polymerization conditions, at or above atmospheric pressure, with a homogeneous catalyst system, said homogeneous catalyst system comprising: (a) a cationic form of a tetrahedral complex having: (i) a transition metal center, and (ii) one or more Lewis basic pendant groups capable of donating one or more pairs of free electrons to the transition metal center; and (b) an anion of an acid selected from the group consisting of a Lewis acid and a Brönsted acid, to obtain an elastomer.

In a preferred embodiment, the cationic form of the tetrahedral complex is of the form:

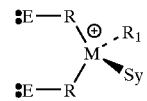

wherein: E is a donating group with a free pair of electrons; $R_1$ is selected from the group consisting of H, alkyl, aryl and silyl; S is a solvent molecule; y is 0 or 1; and R is C, B, N, P, O, S or any other anionic bridging group.

Preferably, the tetrahedral complex is of the form:

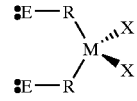

wherein: X is a halide; E is a donating group with a free pair of electrons; and R is C, B, N, P, O, S or any other anionic bridging group.

E. Hydrogenation

The racemic mixture of $C_2$-symmetry and $C_3$-symmetry complexes and monoheteroallylic complexes have been found to be also useful as catalysts for the hydrogenation of olefins. Thus, in the presence of such catalysts of the present invention, ethane is formed from a mixture of ethylene and hydrogen. Since there is a competition between the insertion (polymerization) and the hydrogenation processes, the reaction can be driven towards the required product by controlling the partial pressure of the gases.

The present invention will be described in more detail with the aid of the following non-limiting examples.

Thus, additional objects, advantages, and novel features of the present invention will become apparent to one ordinarily skilled in the art upon examination of the following examples, which are not intended to be limiting. Additionally, each of the various embodiments and aspects of the present invention as delineated herein above and as claimed in the claims section below finds experimental support in the following examples.

All manipulation of air-sensitive materials were performed with the rigorous exclusion of oxygen and moisture in flamed Schlenk-type glassware on a dual manifold Schlenk line, or interfaced to a high-vacuum ($10^{-5}$ torr) line, or in a nitrogen-filled Vacuum Atmosphere glove box with a medium capacity recirculator (1–2 ppm $O_2$). Argon and nitrogen were purified by passage through a MnO oxygen-removal column. Ether solvents were distilled under argon from benzophenone ketyl. Hydrocarbon solvents (toluene- $d_8$, $C_6D_6$, hexane) and TMEDA were distilled under nitrogen from Na/K alloy. All solvents for vacuum line manipulations were stored under vacuum over Na/K alloy in resealable bulbs. Nitrile compounds (Aldrich) were degassed and freshly distilled under argon.

Precursors such as $LiN(TMS)_2$, $4\text{-}CH_3\text{---}C_6H_4\text{---}(NSiMe_3)_2Li\cdot TMEDA$, $C_6H_5C[NC(i\text{-}Pr)_2]Li$ and $C_6H_5C[NC(C_6H_{11})_2]Li\cdot TMEDA$ were prepared according to methods known in the art.

EXAMPLE 1

Synthesis of $4\text{-}CH_3C_6H_4C(NSiMe_3)_2Li\text{-}TMEDA$ 15.86 g (0.095 mol) of LiN(trimethylsilyl)$_2$ were stirred in a hexane suspension (180 ml) at 0° C. and then 11.1 g (0.095 mol) of 4-methylbenzonitrile were slowly added. The temperature of the mixture was slowly raised to about 50° C. and stirred for three additional hours.

After cooling to room temperature, 14.48 g (0.123 mol) of TMEDA were added and the solution was stirred for about one hour. During the addition of the TMEDA, the color of the solution turned brown-red and after several minutes, a large amount of the above product precipitated. The solution stood overnight at about 50° C. and was filtered while cold. The precipitate was dried under a high vacuum, and 31.6 g of a white crystalline product (corresponding to a yield of 83%) was obtained.

EXAMPLE 2

Synthesis of dichloro-bis(N,N'-trimethylsilyl-4-methyl-benzamidinato)-Zr(IV)

To a solution of 5.96 g (15.8 mmol) of $ZrCl_4(THF)_2$ in 130 ml of THF, a solution of 12.66 g (31.6 mmol) of $Li[4\text{-}CH_3C_6H_5C(NSi((CH_3)_3)_2]\cdot TMEDA$ in 100 ml of THF was added while stirring. The reaction mixture was stirred overnight at room temperature and the solvent was removed under vacuum. The residue obtained was extracted with 80 ml of toluene and the precipitated LiCl was removed by filtration through a thin layer of Celite filter-aid. The clear filtrate was evaporated to dryness, washed with 20–30 ml of hexane and dried under vacuum for about 12 hours, obtaining 9.7 g of a yellow product (corresponding to a yield of 86%).

EXAMPLE 3

Synthesis of dichloro-bis(N,N'-dicyclohexylbenzamidinato)-titanium(IV)

To a solution of 5.27 g (15.8 mmol) of $TiCl_4(THF)_2$ in 130 ml of THF, a solution of 9.97 g (34.3 mmol) of $Li[C_6H_5C(NC_6H_{11})_2]$ in 100 ml of THF was added while stirring. The reaction mixture was stirred overnight at room temperature and the solvent was removed under vacuum. The residue obtained was extracted with 80 ml of toluene and the precipitated LiCl was removed by filtration through a thin layer of Celite filter-aid. The clear filtrate was evaporated to dryness, washed with 20–30 ml of hexane and dried under vacuum for about 12 hours, obtaining 9.2 g of a red product (corresponding to a yield of 84.5%).

EXAMPLE 4

Synthesis of Dichloro-bis(N,N'-diisopropylbenzamidinato)-zirconium(IV)

To a solution of 7.54 g (20.0 mmol) $ZrCl_4(THF)_2$ in 130 ml THF, a solution of 8.41 g (40.0 mmol) of $Li[C_6H_5C(NC_3H_7)_2]$ in 100 ml of THF was added dropwise at room temperature over a period of 15 minutes. The reaction mixture was stirred overnight at room temperature. The solvent was removed under vacuum, and the residue extracted with 80 ml of toluene. The precipitated LiCl was removed by filtration through a thin layer of Celite filter-aid. The clear filtrate was evaporated to dryness, washed with hexane (20–30 ml) and dried under vacuum for about 12 hours, thus obtaining 6.78 g (corresponding to a yield of 60%) of a pale yellow, crystalline powder.

EXAMPLE 5

Synthesis of dichloro-bis(N,N'-dicyclohexyl-benzamidinato)zirconium(IV)

To a solution of 5.96 g (15.8 mmol) $ZrCl_4(THF)_2$ in 130 ml THF, a solution of 9.97 g (34.3 mmol) $Li[C_6H_5C(NC_6H_{11})_2]$ in 100 ml THF was added dropwise. The reaction mixture was stirred overnight at room temperature. The solvent was removed by vacuum, and the residue was extracted with 80 ml of toluene. The precipitated LiCl was filtered through a thin layer of Celite filter-aid. The clear filtrate was evaporated to dryness, washed with hexane (20–30 ml) and dried under vacuum for about 12 hours, thus obtaining 9.02 g (corresponding to a yield of 78%) of a red product.

EXAMPLE 6

Synthesis of dichloro-bis(N,N'-diphenylbenzamidinato)-zirconium (IV)

To a solution of 6.49 g (17.2 mmol) $ZrCl_4(THF)_2$ in 130 ml THF, a solution of 9.53 g (34.3mmol) $Li[C_6H_5C(NC_6H_5)_2]$ in 100 ml THF was added dropwise. The reaction mixture was stirred overnight at room temperature. The solvent was removed under vacuum and the residue extracted with 80 ml of toluene. The precipitated LiCl was filtered through a thin layer of Celite filter-aid. The clear filtrate was evaporated to dryness, washed with hexane (20–30 ml) and dried under vacuum for about 12 hours, thus obtaining 9.62 g (corresponding to a yield of 80%) of a pale-yellow product.

EXAMPLE 7

Polymerization of an Olefin

Six mg ($8.23 \cdot 10^{-3}$ mmol) of the catalyst described in Example 5 and 200 mg of MAO were introduced into the reactor, pumped-down and back-filled three times. The flask was reevacuated and 30 ml of toluene (dried over Na/K), or $CH_2Cl_2$ (dried over $CaH_2$), were transferred by vacuum into the reactor. A large excess of gaseous propylene was introduced to the reactor at −78° C. through a gas purification column. The reactor was heated to the required temperature and the gas pressure was obtained from the well-known pressure-temperature relationships. Upon reaching temperature equilibration, the solution was stirred rapidly, and after a period of about two hours, the polymerization was quenched by injecting a mixture of methanol/HCl.

The polymeric product was filtered, washed with acetone and pentane and dried under vacuum. The methanol-insoluble fraction (more than 98% of the product) was extremely crystalline; as measured by $^{13}C$ NMR spectroscopy, the product material was 98.5% isotactic. The DSC melting point was between 161° C. and 165° C.

EXAMPLE 8

Olefin Copolymerization

Six mg ($8.23 \cdot 10^{-3}$ mmol) of the catalyst described in Example 5 and 200 mg of methylalumoxane (MAO) were introduced into the reactor and connected to a high vacuum line. The reactor vessel was pumped-down and back filled three times, the flask was evacuated, and 30 ml of toluene (dried over Na/K) were transferred by vacuum into the reactor.

A mixture of gaseous propylene and butene (50%/50%), with a large excess with respect to both components, was introduced into the reactor through the gas purification column. The reactor was heated to room temperature, resulting in a pressure of about 12 atm. After temperature equilibration, the solution was stirred rapidly for about 2 hours, and the polymer obtained was quenched by injecting a mixture of methanol/HCl. A copolymer of isotactic polypropylene-butylene was produced.

The co-polymer was filtered, washed with acetone and pentane, and dried under vacuum. The methane-insoluble fraction (amounting to more than 90% of the product) was of extremely high crystallinity, with an isotacticity of between 98%–99% as determined by $^{13}$C NMR spectroscopy.

In a similar manner, a block copolymerization is obtained by first reacting 100% of the propylene at high pressure and then carrying out the reaction under an atmosphere of 100% butene, followed by quenching of the obtained product material.

EXAMPLE 9

Olefin Hydrogenation

Six mg (10.5·10$^{-3}$ mmol) of the catalyst described in Example 4 and 200 mg of MAO were introduced into a reactor containing a magnetic stirring bar. The reactor was connected to a high vacuum line, pumped-down and back-filled three times. The vessel was evacuated and 30 ml of toluene (dried over Na/K) or pentane were added by vacuum therein. A mixture of gaseous propylene and hydrogen gas (50%/50%) was introduced into the reactor through a gas purification column. The hydrogenation started almost immediately and could be monitored manometrically to completion.

EXAMPLE 10

Preparation of a Rubbery Polymer

Six mg (8.36·10$^{-3}$ mmol) of the catalyst described in Example 2 and 200 mg of MAO were charged in the reactor connected to a high vacuum line, pumped down and back-filled three times. The flask was evacuated and 30 ml of toluene (dried over Na/K) or CH$_2$Cl$_2$ (dried over CaH$_2$) were vacuum transferred into the reactor. Propylene was introduced into the reactor, and the temperature equilibrated to about 50° C. (For higher-order alpha-olefins, the reaction was performed at higher temperatures such that the monomer concentration in solution could be strongly influenced by pressure.) Upon adjusting the vessel pressure to 10 atmospheres, the polymerization started immediately. Afterwards, the pressure was reduced by means of a piston to atmospheric pressure and back to high pressure at a frequency of 5 fluctuations per minute.

An atactic polymer was obtained at atmospheric pressure, while a stereoregular polymer was obtained at high pressure, such that by varying the pressure at the proper frequency, a rubbery polymer is produced, containing in each individual chain, both isotactic and atactic segments. The modulus of elasticity of the propylene elastomer obtained was 2500 psi, which is substantially identical to the modulus of natural rubber and SBR polymers.

Using this method were prepared elastomeric polypropylene, polybutene, polyhexene, polybutadiene, and others.

EXAMPLE 11

Preparation of Rubbery Co-homopolymer

In a similar manner, block copolymerization is obtained by first reacting 100% propylene at high pressure and then reacting the same propylene at atmospheric pressure.

EXAMPLE 12

Preparation of a Rubbery Co-heteropolymer

The process of Example 11 was repeated, wherein first the propylene was polymerized at high pressure and then butylene was reacted at atmospheric pressure, thus producing a rubbery heteropolymer.

EXAMPLE 13

Preparation of a Rubbery Co-heteropolymer

The procedure of Example 10 was repeated using a mixture of propylene and styrene as monomers, with the polymerization being carried out in a reactor at normal (atmospheric) pressure at all times. A rubbery co-heteropolymer having sequences of atactic polypropylene and syndiotactic polystyrene was obtained.

EXAMPLE 14

Preparation of a Rubbery Homopolymer with a Ti-based Complex at High Pressure

Instead of using a zirconium-based catalyst under alternating pressure as in Example 10, a titanium-based catalyst at high pressure was tested following the same basic procedure. Ten mg (0.0198 mmol) of the catalyst (4-CH$_3$—C$_6$H$_4$)—C(N(Si(CH$_3$)$_3$)$_2$)TiCl$_3$—THF and 300 mg of MAO were charged in the reactor connected to a high vacuum line, pumped down and back-filled three times, the flask was evacuated and 5 ml of toluene (dried over Na/K) or CH$_2$Cl$_2$ (dried over CaH$_2$) were vacuum transferred into the reactor. Propylene was introduced into the reactor, and the temperature was allowed to equilibrate to about 50° C. Upon adjusting the vessel pressure to 10.2 atmospheres, the polymerization started immediately.

About 0.9 g of an elastomeric polypropylene was obtained and characterized by $^{13}$C NMR spectroscopy.

EXAMPLE 15

Synthesis of [CH$_3$C(NSiMe$_3$)$_2$]$_2$Zr(NMe$_2$)$_2$

To a solution of 4.27 g (16 mmol) of Zr(NMe$_2$)$_4$ in 130 ml of THF, a solution of 6.46 g (32.0 mmol) of (Me$_3$SiN)(Me$_3$SiNH)CCH$_3$ in 150 ml of THF was added while stirring at −78° C. The reaction mixture was allowed to warm to room temperature, and was then heated under reflux for 16 hours. The solvent was removed under vacuum. The residue was recrystallized in a solvent mixture of toluene:hexane (20:80%), and 6.19 g (corresponding to a yield of 64%) of a yellow-colored product was obtained.

EXAMPLE 16

Polymerization of Propylene Using [CH$_3$C(NSiMe$_3$)$_2$]$_2$Zr(NMe$_2$)$_2$

A thick-walled glass reactor was charged in a glovebox with 10 mg of [(Me$_3$SiNCH)$_2$CH]Zr(NMe$_2$)$_2$ and 800 mg of MAO, removed from the glovebox and connected to a high vacuum line. To the reactor were transferred, by vacuum, 20 ml of toluene. Subsequently, 25 ml of liquid propylene were transferred to the reactor. After temperature equilibration to room temperature, the solution was stirred rapidly for two hours, and the polymerization was quenched. The polymeric product was filtered and washed to obtain a highly crystalline polypropylene (mmmm 98.5%) with a melting point of 152° C.

EXAMPLE 17

Preparation of [TiCl$_2$\{N(PPh$_2$)$_2$\}]

To a stirred solution of [Li(THF)N(PPh$_2$)$_2$]$_2$ (2.0 g, 2.16 mmol) in 50 ml THF, was added TiCl$_4$ (0.24 ml, 2.16 mmol) dropwise at room temperature. The reaction mixture was stirred overnight, the solvent removed in vacuum and the residue extracted with 30 ml of toluene. Hexane was added to the filtrate to precipitate a brown solid, which was recrystallized from dichloromethane at −78° C. Yield 35%. Mp 120° C. (dec.). C$_{48}$H$_{40}$Cl$_2$N$_2$P$_4$Ti (887.5), calc. C, 64.96; H, 4.54; N, 3.16. Found, C, 64.03; H, 4.86; N, 3.01.

EXAMPLE 18

Synthesis of [C$_6$H$_5$(N-TMS)(N-myrtanyl)]TiCl$_3$

To a stirred solution of 0.692 g (3.7 mmol) of TiCl$_4$ in 20 ml of tetrahydrofuran was added dropwise at room temperature, a solution of 1.7 g (3.7 mmol) of C$_6$H$_5$C(N-TMS)(N-myrtanyl)Li.TMEDA in 10 ml of tetrahydrofuran. The reaction mixture was stirred overnight, the solvent was removed by vacuum, and the residue was extracted four times with 80 ml of toluene. LiCl was removed by filtration through a thin layer of dried Celite filter-aid. The clear filtrate was evaporated to dryness, washed with 30 ml of hexane, and dried under vacuum to obtain 1.83 g (corresponding to a yield of 89.2%) of a red microcrystalline complex. Found: C, 51.47; H, 7.03; N, 4.74. Calcd. for C, 52.04; H, 7.09; N, 5.06.

EXAMPLE 19

Polymerization of Propylene Using [C$_6$H$_5$(N-TMS)(N-myrtanyl)]TiCl$_3$

A 100-ml heavy-wall glass reactor, equipped with a strong magnetic stirrer and flame-dried under vacuum for a few hours, was charged with 5 mg of the catalyst of Example 18 and a measured amount of MAO (ratio Ti:Al=1:400) into the glovebox. The reactor was connected to a high-vacuum line, and 20 ml of CH$_2$Cl$_2$ (dried over P$_2$O$_5$) or toluene (dried over Na/K) were condensed by vacuum transfer. After equilibration of the temperature, the reactor was cooled to 150 C., and an excess of propylene (purified by passage through a MnO oxygen-removal column and a Davison 4 molecular sieve column) was introduced into the reactor. The temperature was raised and equilibrated using a bath equipped with a thermostat, and the pressure was controlled by means of a manometer to 10 atm. The reactor was stirred strongly for a period of few hours. The polymerization was quenched by exhausting the excess propylene into a well-ventilated hood, followed by the fast introduction of 30 ml of methanol/HCl. The elastomeric polypropylene was filtered, washed several times with hexane and acetone, and dried under vacuum at 0.001 mm Hg at 60° C. for several hours. The filtrate solution obtained contained no atactic or low molecular weight polymer.

EXAMPLE 20

Polymerization of Elastomeric Polypropylene Promoted by a Racemic bis(benzamidinate)Ti complex (cis-[p-CH$_3$C$_6$H$_4$C(NSiMe$_3$)$_2$]$_2$TiCl$_2$)

The experiments were conducted in a 100 ml flamed round-bottom reaction flask attached to a high-vacuum line. In a typical experiment, 4.0 mg of the catalyst and 205 mg of MAO (Zr:Al=1:400) were charged in the flask containing a magnetic stir bar. The reaction vessel was pumped down and back filled three times with argon. The flask was re-evacuated, and a measured quantity of toluene (40 ml), dried over Na/K, was vacuum transferred into the reaction flask. Subsequently, gaseous propylene was condensed into the vessel through a gas purification column. The flask was warmed to room temperature and the pressure was continuously measured by means of a manometer and maintained at 10 atm. Rapid stirring of the solution was initiated, and after a measured time interval (2 h), the polymerization was quenched by ejecting the excess pressure of propylene and immediately injecting a mixture of methanol/HCl. The elastomeric polymeric product was collected by filtration, washed with hexane and acetone and dried under vacuum for several hours, producing an elastomer with a degree of crystallinity (mmmm) of 57%. The modulus of elasticity of the elastomer was 2300 psi, which is similar to the modulus of natural rubber and SBR polymers.

EXAMPLE 21

Synthesis of [C$_6$H$_5$C(N-TMS)(N-myrtanyl)]ZrCl$_3$.THF (a Chiral Zr Complex Having C$_1$ Symmetry)

To a stirred solution of 5.2 g (22.2 mmol) of ZrCl$_4$ in 130 ml of tetrahydrofuran was added dropwise at room temperature, a solution of 10 g (22.2 mmol) of C$_6$H$_5$C(N-TMS)(N-myrtanyl)Li TMEDA in 100 ml of tetrahydrofuran. The reaction mixture was stirred overnight, the solvent was removed by vacuum, and the residue was extracted with 80 ml of toluene. LiCl was removed by filtration through a thin layer of dried Celite filter-aid. The clear filtrate was evaporated to dryness, washed with 30 ml of hexane, and dried under vacuum to obtain 9.94 g (corresponding to a yield of 75%) of a yellow microcrystalline complex. Found: C, 48.12; H, 6.67; N, 4.54; Cl, 18.00. Calcd. for C, 48.26; H, 6.58; N, 4.69; Cl, 17.81.

EXAMPLE 22

Polymerization of Elastomeric Polypropylene Using [C$_6$H$_5$C(N-TMS)(N-myrtanyl)]ZrCl$_3$.THF The experiments were conducted in a 100 ml flamed round-bottom reaction flask containing a magnetic stir bar. In a typical experiment, 6.0 mg of the catalyst described in Example 21 and 240 mg of MAO (Zr:Al=1:400) were charged in the flask. The reaction vessel was connected to a high vacuum line, pumped down and back filled three times with argon. The flask was re-evacuated and 40 ml of toluene, dried over Na/K, was vacuum transferred into the reaction flask. Subsequently, gaseous propylene was condensed into the vessel through a gas purification column. The flask was warmed to room temperature and the pressure (10 atm) was continuously measured by means of a manometer. Rapid stirring of the solution was initiated and after two hours, the polymerization was quenched by ejecting the excess pressure of propylene and immediately injecting a mixture of methanol/HCl. The elastomeric polymeric product was collected by filtration, washed with hexane and acetone and dried under vacuum for several hours. The degree of crystallinity of the elastomeric product was mmmm=38%.

EXAMPLE 23

Synthesis of [C$_6$H$_5$C(N-TMS)(N-phenethyl)]ZrCl$_3$.THF

To a stirred solution of 5.2 g (22.2 mmol) of ZrCi$_4$ in 130 ml of tetrahydrofuran was added dropwise at room temperature, a solution of 9.30 g (22.2 mmol) of C$_6$H$_5$C(N-TMS)(N-phenethyl)Li TMEDA in 120 ml of tetrahydrofuran. The reaction mixture was stirred overnight, the solvent was removed by vacuum, and the residue was extracted with 80 ml of toluene. LiCl was removed by filtration through a thin layer of dried Celite filter-aid. The clear filtrate was evaporated to dryness, washed with 30 ml of hexane, and dried under vacuum to obtain 6.27 g (corresponding to a yield of 50%) of a yellow microcrystalline complex. Found: C, 46.53; H, 5.32; N, 4.87; Cl, 18.78. Calcd. for C, 46.75; H, 5.53; N, 4.96; Cl, 18.82.

EXAMPLE 24

Polymerization of Elastomeric Polypropylene Using [C$_6$H$_5$C(N-TMS)(N-phenethyl)]ZrCl$_3$.THF The experimental polymerization procedure of Example 22 was duplicated using the catalyst material of Example 23. The degree of crystallinity of the elastomeric product obtained was mmmm=42%.

EXAMPLE 25

Styrene Polymerization

The polymerization was carried out in a 100 ml glass reactor (fully covered against light) equipped with a magnetic stirring bars. The temperature was maintained at the desired temperature (25° C.) using a bath equipped with a thermostat. The reactor was charged with 5 mg of the catalyst as described in Example 19 and a measured amount of MAO (ratio Ti:Al=1:400). The reactor was connected to a high vacuum line, and 20 ml of toluene (dried over Na/K alloy) were condensed by vacuum transfer. After equilibration of the temperature, a measured amount of freshly distilled styrene (kept at −20° C. and covered against light) was introduced into the reactor by mean of a gas-tight syringe. The temperature was raised and equilibrated by means of the thermostated bath. The reactor was stirred vigorously for a period of 2 hours. The polymerization was quenched by the fast introduction of 30 ml of methanol/HCl. The polymer was filtered, washed several times with hexane and acetone, and dried under vacuum at 0.001 mm Hg at 60° C. for several hours to obtain 100% conversion of 99.9% syndiotactic polystyrene.

EXAMPLE 26

Preparation of Polymer from [TiCl$_2${N(PPh$_2$)$_2$}]

These experiments were conducted in a 100 ml flamed round-bottom reaction flask attached to a high-vacuum line. In a typical experiment 4.0 mg of the catalyst described in Example 17 and 205 mg of MAO (Zr:Al=1:400) were charged in the flask containing a magnetic stir bar. The reaction vessel was connected to a high vacuum line, pumped down and back filled for three times with argon. The flask was re-evacuated and 40 ml of toluene (dried over Na/K alloy) was vacuum transferred into the reaction flask. Gaseous propylene was then condensed into the vessel through a gas purification column. The flask was warmed to room temperature and the pressure was continuously measured by means of a manometer. After rapidly stirring the solution for 2 hours, the polymerization reaction was quenched by ejecting the excess pressure of propylene and immediately injecting a mixture of methanol/HCl. The elastomeric polymeric product was collected by filtration, washed with hexane and acetone and dried under vacuum for several hours producing an elastomer with a degree of crystallinity (mmmm) of 45%.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications cited herein are incorporated by reference in their entirety. Citation or identification of any reference in this application shall not be construed as an admission that such reference is available as prior art to the present invention.

What is claimed is:

1. A process for the polymerization of one or more alpha-olefins having at least 3 carbon atoms, the process comprising:
    (a) contacting alpha-olefin monomer or monomers in a solvent selected from the group consisting of polar solvents and non-polar solvents under polymerization conditions with a homogeneous catalyst system including:
        (i) a cationic form of a chiral or a non chiral octahedral transition metal complex, comprising 1, 2 or 3 bidentate chelating ligands and no cyclopentadienyl ligands and having symmetry selected from the group consisting of C$_1$, C$_2$, and C$_3$ symmetries; and
        (ii) an anion of an acid selected from the group consisting of a Lewis acid and a Brönsted acid; and
    (b) adjusting the pressure to obtain either a highly stereoregular polymer, a copolymer or an elastomer,
    provided that when said alpha-olefin is styrene, said process is used for the production of stereoregular polystyrene and said octahedral transition metal complex comprises one ligand, said ligand is chiral.

2. The process according to claim 1, wherein said homogeneous catalyst system includes a racemic or non-racemic mixture of said chiral octahedral transition metal complex.

3. The process according to claim 1, wherein said cationic form of said octahedral transition metal complex has the formula:

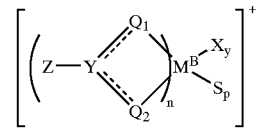

wherein:
    M is a transition metal atom selected from groups III, IV, and V of the periodic table;
    B is the valency of M and equals 3, 4 or 5;
    Y is selected from the group consisting of C, N, S, P, B and Si;
    X is an anionic ligand;

$Q_1$ and $Q_2$ are each independently selected from the group consisting of O, OR, N, NR, $NR_2$, CR, $CR_2$, S, SR, $SiR_2$, B, BR, $BR_2$, P, PR and $PR_2$, where each R is independently H or a group containing C, Si, N, O, B and/or P, whereas one or more R groups may be attached to said transition metal atom M while replacing said X ligand;

Z is selected from the group consisting of H, OR, $NR_2$, CR, $CR_2$, $CR_3$, SR, $SiR_3$, $PR_2$ and $BR_2$;

S is a solvent molecule;

n is 1, 2 or 3;

y equals (B−n−1); and p is 0 or an integer to satisfy octahedral coordination requirements of the transition metal.

4. The process according to claim 1, wherein said cationic form of said octahedral transition metal complex has the formula:

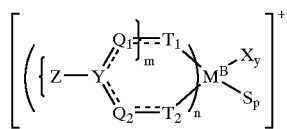

wherein:

M is a transition metal atom selected from groups III, IV and V of the periodic table;

B is the valency of M and equals 3, 4 or 5;

Y is selected from the group consisting of C, N, S, P, B and Si;

X is an anionic ligand;

$Q_1$, $Q_2$, $T_1$ and $T_2$ are each independently selected from the group consisting of O, OR, N, NR, $NR_2$, CR, $CR_2$, S, SR, $SiR_2$, B, BR, $BR_2$, P, PR and $PR_2$, where each R is independently H or a group containing C, Si, N, O, B and/or P, whereas one or more R groups may be attached to said transition metal atom M while replacing said X ligand;

Z is selected from the group consisting of H, OR, $NR_2$, CR, $CR_2$, $CR_3$, SR, $SiR_3$, $PR_2$ and $BR_2$;

S is a solvent molecule;

n is 1, 2 or 3;

y equals (B−n−1);

m is 1, 2, 3 or 4 p is 0 or an integer to satisfy octahedral coordination requirements of the transition metal.

5. The process according to claim 1, wherein said octahedral transition metal complex is of a symmetry selected from the group consisting of $C_2$ and $C_3$ symmetries, said transition metal is selected from the group consisting of zirconium and hafnium, said adjusting pressure consists of applying high pressures, and wherein substantially pure isotactic poly alpha-olefins are produced.

6. The process according to claim 1, wherein said octahedral transition metal complex is of a symmetry selected from the group of $C_2$ and $C_3$ symmetries, said transition metal is selected from the group consisting of zirconium and hafnium, said adjusting pressure includes alternating pressure between high pressure and low pressure, and wherein elastomeric poly alpha-olefins are produced.

7. The process according to claim 6, wherein said alternating pressure is carried out at a frequency about equal to or lower than the polymerization insertion rate.

8. The process according to claim 1, wherein said octahedral transition metal complex has $C_1$ symmetry and comprises one bidentate chelating ligand, said transition metal is selected from the group consisting of zirconium and hafnium, said adjusting the pressure consists of applying high pressures, and wherein the poly alpha-olefins produced are substantially elastomeric.

9. The process according to claim 3 or 4, wherein said octahedral transition metal complex has $C_1$ symmetry, n equals one, said transition metal is selected from the group consisting of zirconium and hafnium, and wherein high pressure is applied to produce poly alpha-olefins that are substantially elastomeric.

10. The process according to any one of claim 1, 5, 6 or 7, wherein said transition metal is selected from the group consisting of vanadium, niobium, tantalum, scandium, yttrium, lanthanum, lanthanides, and actinides.

11. A polymerization process comprising the steps of contacting styrene monomer or monomers comprising styrene in a solvent selected from the group consisting of polar and non-polar solvents under polymerization conditions and at a pressure of about atmospheric or higher with a homogeneous catalyst system including:

(i) a cationic form of a chiral octahedral transition metal complex comprising 1, 2 or 3 bidentate chelating ligands and no cyclopentadienyl ligands and having symmetry selected from the group consisting of $C_1$ and $C_2$ symmetries; and (ii) an anion of an acid selected from the group consisting of a Lewis acid and a Brönsted acid;

to obtain syndiotactic polystyrene or a copolymer comprising syndiotactic polystyrene, provided that when said octahedral transition metal complex comprises one ligand, said ligand is chiral.

12. The process according to claim 11, wherein said monomers comprising styrene include aliphatic alpha-olefin, and wherein said polymerization conditions include operation at low pressure, such that an elastomeric copolymer containing sequences of syndiotactic polystyrene and atactic poly-aliphatic alpha-olefins is obtained.

13. The process according to claim 12, wherein said aliphatic alpha-olefin is propylene.

14. The process according to claim 11, wherein said monomers comprising styrene include aliphatic alpha-olefin, and wherein said polymerization conditions include operation at alternating pressure, such that an elastomeric copolymer containing sequences of syndiotactic polystyrene and elastomeric poly-aliphatic alpha-olefins is obtained.

15. The process according to claim 14, wherein said aliphatic alpha-olefin is propylene.

16. A process for the polymerization of one or more alpha-olefins having at least 3 carbon atoms, the process comprising the step of contacting alpha-olefin monomer or monomers in a solvent selected from the group consisting of polar solvents and non-polar solvents under polymerization conditions, at or above atmospheric pressure, with (i) a homogeneous catalyst system, said homogeneous catalyst system comprising a cationic form of a tetrahedral complex having a transition metal center, and one or more Lewis basic pendant groups, said pendant groups being capable of donating one or more pairs of free electrons to said transition metal center; and (ii) an anion of an acid selected from the group consisting of a Lewis acid and a Brönsted acid;

to obtain an elastomer having a particular degree of stereoregularity.

17. The process according to claim 16, wherein said cationic form of said tetrahedral complex is of the form:

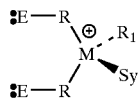

wherein:

M is a transition metal atom selected from groups III, VI, V, VI, VII and VIII of the periodic table;

E is a donating group with a free pair of electrons;

$R_1$ is selected from the group consisting of H, alkyl, aryl and silyl;

S is a solvent molecule;

y is 0 or 1; and

R is C, B, N, P, O, S or any other anionic bridging group.

18. The process according to claim 16, wherein said tetrahedral complex is of the form:

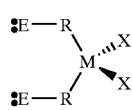

wherein:

M is a transition metal atom selected from groups III, IV, V, VI, VII and VIII of the periodic table;

X is a halide;

E is a donating group with a free pair of electrons; and

R is C, B, N, P, O, S or any other anionic bridging group.

19. The process according to claim 16, wherein said cationic form of said tetrahedral complex is converted through dynamic equilibrium to a cationic octahedral complex.

20. The process according to claim 16, wherein a combination of a specific cationic form of a tetrahedral complex, specific monomer or monomers, specific solvent, and specific polymerization conditions are employed so as to tailor said degree of stereoregularity of said elastomer.

21. The process according to claim 1, wherein said octahedral transition metal complex is of a symmetry selected from the group of $C_2$ and $C_3$ symmetries, said transition metal is selected from the group consisting of zirconium and hafnium, said adjusting pressure consists of operating at high pressure to produce stereoregular poly alpha-olefins and operating at low pressure in the presence of said stereoregular poly alpha-olefins to produce atactic poly alpha-olefins that are incorporated into said stereoregular poly alpha-olefins, thereby producing an elastomeric polymer or copolymer.

22. The process according to claim 21, wherein said elastomeric polymer or copolymer includes polypropylene.

23. A polymer comprising one or more polymerized alpha-olefins having at least 3 carbon atoms, prepared by the process of claim 1.

24. A copolymer comprising two or more polymerized alpha-olefins having at least 3 carbon atoms, prepared by the process of claim 1.

25. An elastomer comprising one or more polymerized alpha-olefins having at least 3 carbon atoms, prepared by the process of claim 1.

26. A polymer comprising syndiotactic polystyrene, prepared by the process of claim 11.

27. An elastomer having a particular degree of stereoregularity and comprising one or more polymerized alpha-olefins having at least 3 carbon atoms, prepared by the process of claim 16.

* * * * *